United States Patent [19]
Cowan

[11] 3,779,267
[45] Dec. 18, 1973

[54] FLUID OPERATED LOGIC DEVICE

[75] Inventor: Larry Clyde Cowan, Jamestown, R.I.

[73] Assignee: Leesona Corporation, Warwick, R.I.

[22] Filed: July 26, 1971

[21] Appl. No.: 165,446

[52] U.S. Cl. .............................. 137/111, 137/832
[51] Int. Cl. ............................................. F15c 3/04
[58] Field of Search.................. 137/100, 102, 119, 137/111, 112, 113, 118, 81.5, 607, 832; 235/201 ME; 251/61.1, 129

[56] References Cited
UNITED STATES PATENTS

| | | | |
|---|---|---|---|
| 2,778,373 | 1/1957 | Jaquith | 137/112 |
| 3,504,693 | 4/1970 | Hartman | 235/201 ME |
| 3,635,251 | 1/1972 | Gaines | 137/607 X |
| 3,641,529 | 2/1972 | Bitzel et al. | 251/129 X |
| 3,504,692 | 4/1970 | Goldstein | 137/119 |
| 3,362,633 | 1/1968 | Freeman | 137/111 |
| 3,638,601 | 1/1972 | Larson | 137/100 |
| 3,633,605 | 1/1972 | Smith | 137/113 |

Primary Examiner—William R. Cline
Attorney—Albert P. Davis et al.

[57] ABSTRACT

Fluid operated logic device providing a positive going OR or a negative going AND signal is disclosed. Input signals are provided via fluid moving in first and second circuits or fluid flow paths which pass through a common chamber. The chamber incorporates a fluid impervious flexible diaphragm which isolates the first and second circuits or flow paths within the chamber. The diaphragm is movable in response to fluid movement through one of the first and second flow paths to block the other flow path through the chamber, thereby precluding fluid movement from the inlet to the outlet opening of the other flow path and also preventing feedback of one input signal into the other circuit. The device is passive, operating on signal power alone.

1 Claim, 2 Drawing Figures

INVENTOR.
LARRY C. COWAN

BY

ATTORNEYS

FLUID OPERATED LOGIC DEVICE

FIELD OF THE INVENTION

The present invention relates to fluid operated logic devices and relates, more particularly, to such devices capable of producing positive going OR or negative going AND output signals.

DESCRIPTION OF THE PRIOR ART

Fluid operated logic devices which are capable of serving as either positive going OR device or negative going AND device are well known in the art. These devices are of the active class in that they require a power supply separate from the control signal in order to operate the device. Since such active devices required a relatively large volume of supply fluid and since the flow of the main or power stream is maintained constantly the supply fluid becomes a significant and expensive consideration in the operation of such devices, particularly when operated at high pressures.

SUMMARY OF THE INVENTION

It is one object of the present invention to provide a fluid operated logic device capable of operating as a positive going OR or a negative going AND device.

A further object of the present invention is to provide a fluid operated logic device capable of operating as a positive going OR or a negative going AND device, which said device is passive.

Still a further object of the present invention is to provide a fluid operated logic device which is passive and has no leakage to atmosphere.

Yet, a further object of the present invention is to provide a fluid operated logic device capable of operating at high speeds and at high pressures to provide a positive going OR signal or a negative going AND signal.

An additional object of the present invention is to provide a fluid operated logic device which is capable of providing an output signal of sufficient magnitude to effect a work operation without the necessity of interface elements.

Other objects of the invention will in part be obvious and will in part appear hereinafter.

In brief, and in accordance with the foregoing objects, the invention includes the provision of first and second fluid flow paths, each extending from an inlet to an output opening. Each of the flow paths pass through a common chamber and the chamber includes fluid impervious flexible diaphragm means for isolating the first flow path from the second flow path within the chamber. The diaphragm is movable in response to fluid movement through one of the first and second fluid flow paths to flex the diaphragm and block the other flow path through the chamber. In this manner movement of fluid from the inlet to the output opening of the other flow path is precluded. Also, this other flow path is isolated from any feedback from the path which is conducting fluid. The device may be employed to yield a negative going AND signal or a positive going OR output signal depnding upon the logical state of the input signals. Further, the device is passive and has no leakage to atmosphere. The invention, therefore, has the inherent advantages of rapid action under high fluid pressures, simplicity of constructions, economy in operation and permits the use of the output signal as a power driver without the need for expensive interface elements.

DESCRIPTION OF THE PREFERRED EMBODIMENT

Figure 1:
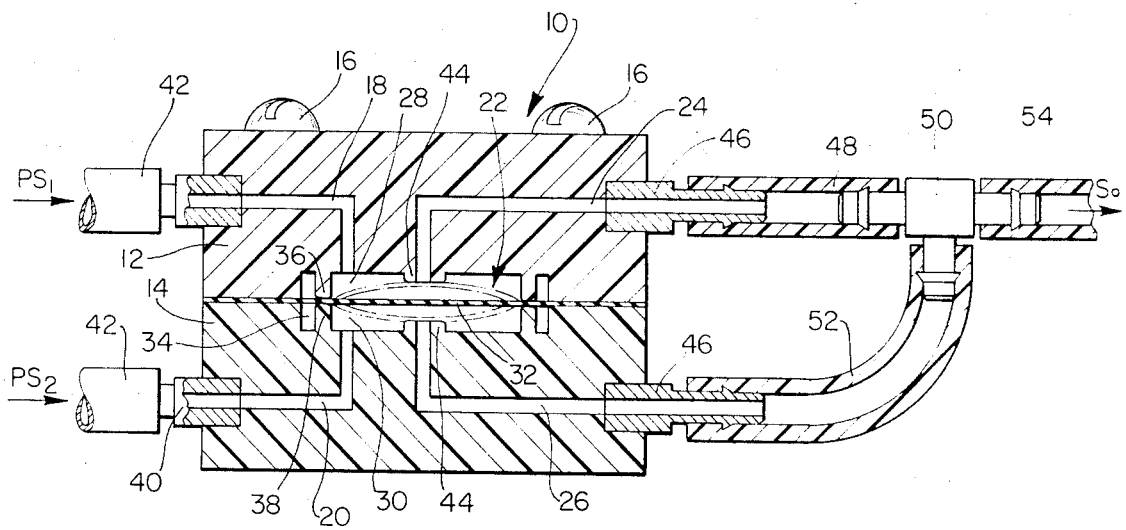
FIG. 1 is a cross section of the present invention illustrating the diaphragm of the controlled fluid chamber in its relaxed, undeflected condition.
Figure 2:
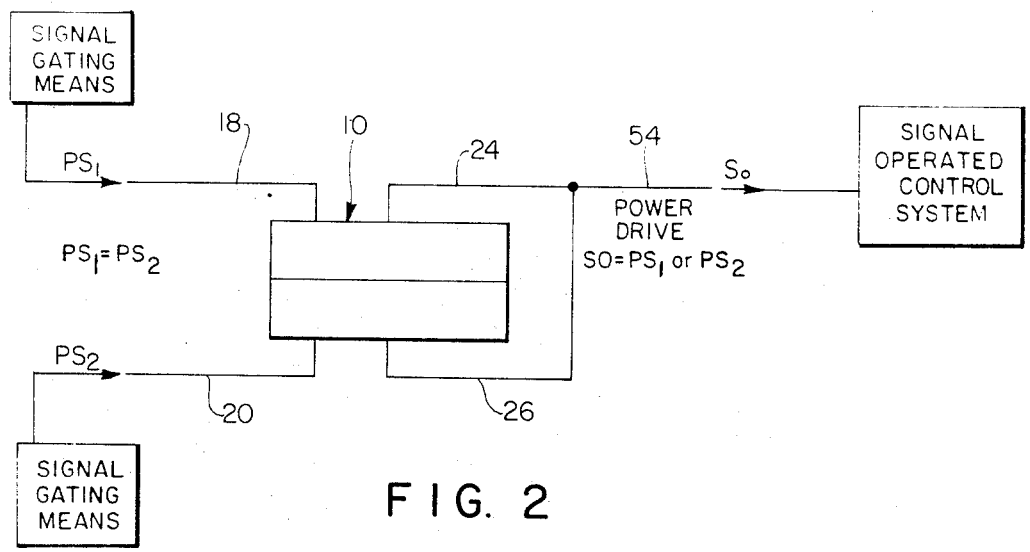
FIG. 2 is a schematic diagram of the device shown in FIG. 1.

Referring now to FIG. 1, there is shown the fluid operated logic device of the present invention. The device includes a laminar block 10 which may be comprised of a pair of mating laminates 12 and 14 held together by means of a plurality of screws 16. The laminates are formed of an impervious material such as plastic or metal. The device 10 includes entry flow paths 18 and 20 which lead into opposite sides of a generally circular chamber 22 that is provided with a pair of exit flow paths 24 and 26 leading therefrom. The chamber 22 is divided into opposite sections or sub-chambers 28 and 30 by means of a flexible, fluid impervious diaphragm 32 formed of an elastomeric material such as rubber or the like which acts as a control within chamber 22. Diaphragm 32 has its outer extremes fastened between the laminates 12 and 14 and spans the entire dimension of chamber 22 to seal and isolate sub-chambers 28 and 30 from each other. Positioned radially outward of chamber 22 there is a slot formed so as to encircle the chamber to provide a clearance 34, and the area between chamber 22 and clearance 34 defines walls 36 and 38 in laminates 12 and 14, respectively. Walls 36 and 38 mate with each other and form a sealing ring which pinches down on diaphragm 32 and thus seal chamber 22 against possible escape of fluid therefrom in a direction between the diaphragm and the laminates. Clearance 34 serves the additional purpose of affording a relief for any expansion of diaphragm 32 incident to is being compressed between laminates 12 and 14.

With continuing reference to FIG. 1, it will be seen that entry flow paths 18 and 20 open into sub-chambers 28 and 30, respectively, of chamber 22. The ends of flow paths 18 and 20 remote from chamber 22 are provided with suitable fittings 40 for receiving separate fluid supply lines 42. In a similar manner, exit flow paths 24 and 26 open into sub-chambers 28 and 30, respectively. However, it is to be noted that the junctures of the exits flow paths 24, 26 with chamber 22 are formed as lip-like edges 44 to provide a suitable seat for diaphragm 32 when the diaphragm is deflected thereagainst. The respective ends of exit flow paths 24 and 26 remote from chamber 32 are provided with suitable fittings 46. An exit fluid line 48 is connected at one of its ends to the fitting 46 of exit flow path 24, and the opposite end of this line is connected into a tee at 50. The exit fluid path 26 has its fitting 46 connected to a further exit line 52 which in turn connects with a further extension of tee 50. A common signal delivery line 54 is connected to the output of tee 50 to convey the fluid signals provided through lines 48 and 52.

The operation of the present invention will now be described. The operating pressures for the present invention may be provided by a gas and the supply pressures $PS_1$ and $PS_2$ entering into entry flow paths 18 and 20, respectively, are normally of substantially the same pressure. As indicated earlier, the present invention is capable of operating under high pressures whereby the logic information provided by the invention is capable of direct use by a control system or other work element without the need to convert or translate the information by interface devices. In keeping with this, the pressures $PS_1$ and $PS_2$ useable by the invention may be in the order of 80–100 PSI and higher, the practical limitation being the ability of diaphragm 32 to withstand the pressure. The low limit of pressure signals $PS_1$ and $PS_2$ may be as small in magnitude as desired consistent with the pressure signal providing sufficient force to deflect diaphragm 32 to seal one or the other of entry flow paths 18 and 20. It will be appreciated that input lines 42 are gated valves upstream of device 10 and by means not herein shown said gating involving means operable on signal to provide pressure into either or both of input paths 18 and 20. For purposes of describing the operation of the present invention let it be assumed firstly that the device is to be operated as a positive going OR device. In this event pressure signal $PS_1$ introduced via line 42 enters sub-chamber 28 or chamber 22 via entry flow path 18. Diaphragm 32 is instantaneously deflected into sealing engagement with edge 44 surrounding inlet exit flow path 26. The fluid is then free to flow through sub-chamber 28 and outwardly via exit flow path 24 to yield output signal $S_0$ of essentially the same magnitude, i.e., the same pressure as input signal $PS_1$. In view of the fact that exit flow path 26 is sealed off by means of diaphragm 32 and, furthermore, considering the amplifying effect of pressure $PS_1$ in sub-chamber 28 acting over the full area of the upper face of diaphragm, any tendancy of pressure $PS_1$ to displace the diaphragm and feed back to entry flow path 20 is prevented. Device 10 will remain in the state just described, i.e., with the path open from entry flow path 18 through sub-chamber 28 and through exit flow path 24 to permit the free passage of fluid until signal pressure $PS_1$ is cut off, at which time diaphragm 32, having a memory by virtue of its inherent elasticity will shift to a relaxed, inactive positon, generally centrally disposed between the edges 44 of exit fluid paths 24 and 26 as shown by the solid lines in FIG. 1. In a similar manner and with continuing reference to the device being utilized as an OR logic device, pressure signal $PS_2$ may be introduced through entry flow path 20 and outwardly into sub-chamber 30, at which time pressure signal $PS_2$ will act to deflect diaphragm 32 into sealing engagement with the edge 44 surrounding the entry of exit flow path 24. Pressure signal $PS_2$ is then free to flow through sub-chamber 30 and outwardly through exit flow path 26 to provide output signal $S_0$ which is essentially the same magnitude, that is, pressure, as signal $PS_2$. Pressure signal $PS_2$ cannot feed back to entry flow path 18 due to the fact that the said flow path is sealed as diaphragm 32 blocks the entry of flow path 24 into chamber 22. In a like manner as described hereinbefore, pressure $PS_2$ exerts an amplifying effect on diaphragm 32 to hold it securely seated on edge 44 proximate to exit flow path 24. Consequently, it will be readily understood that the instant invention advantageously isolates pressure signals $PS_1$ and $PS_2$ from each other while providing a pressure signal $S_0$ which is of essentially the same pressure as either input signal $PS_1$ or $PS_2$. It will be further appreciated that, in veiw of the ability of the present invention to operate under high pressures, pressure signal $S_0$ is operative to be employed as a control system operator or power driver without the need to provide any interface elements to convert output signal $S_0$ for use by a work element.

It has already been explained that the present invention is operable as a negative going AND device and this is achieved by inverting the signals previously described. Thus, negative signals in the form of an absence of pressure above atmospheric are present in entry flow paths 18 and 20, resulting in similar pressures existing in chamber 22 and fluid exit flow paths 24 and 26 when a negative going AND signal is delivered on the output side of the device. At any time pressurized fluid is introduced through either inlet fluid passages 18 and 20, diaphragm 32 is deflected to seal the other fluid passage and, simultaneously, the pressure within chamber 22 and the related exit flow paths 24 and 26 rises to the pressure on the input side of the device thereby cutting off the control signal on the output side of said device.

From the foregoing it will be obvious that the present invention provides a unique and advantageous device operable to provide a positive going OR or negative going AND logic output signal which performs a logic function without a separate power supply. The invention eliminates the need of interface elements between the logic device and a downstream work member, the output signal serving as the power driver. The invention isolates input signals and has no leakage to atmosphere.

It will be readily apparent that only the preferred embodiment of the invention has been specifically disclosed herein, other modified forms of the invention will be obvious from the foregoing. Such modifications are intended to be included with the inventive concept as defined in the appended claims.

What is claimed is:

1. A fluid logic system including a logic device for selecting a single output signal from two fluid input signal paths, said device having a common chamber, two separate fluid inlets and a common outlet opening for producing a controlled fluid output comprising, means defining a first fluid flow path from a first of said inlets to said output opening, means defining a second fluid flow path from the second of said inlets to said output opening, said first and second flow paths passing through said common chamber, said chamber including fluid impervious diaphragm means positioned therein for blocking one of said first and second flow paths within said chamber and for isolating said first flow path from said second flow path within said chamber, said diaphragm means being movable in response to fluid movement into said chamber, means introducing first and second logic input signals comprising discrete fluid flow on-off signals at substantially the same pressure to both said paths whereby fluid flowing through at least one of said first and second flow paths provides to said outlet opening fluid at said input pressure to produce an output signal of the same pressure at said outlet opening, and means operable by fluid flow signals at said pressure coupled with said outlet opening to receive output signals consisting of transfer of fluid flow at said pressure from at least one of said logic input signals flowing through said logic device.

* * * * *